США Patent

Woods et al.

Patent Number: 5,039,753
Date of Patent: Aug. 13, 1991

[54] POLYMERS COMPRISING BETADIKETONE GROUPS AND POLYMERIZABLE COMPOSITIONS CONTAINING SAID POLYMERS

[75] Inventors: John G. Woods, Co. Dublin, Ireland; John Rooney, Basking Ridge, N.J.; Bernard Ryan, Co. Waterford; David Phelan, Waterford, both of Ireland

[73] Assignee: Loctite (Ireland) Ltd, Tallaght, Ireland

[21] Appl. No.: 260,166

[22] Filed: Oct. 20, 1988

[30] Foreign Application Priority Data

Oct. 22, 1987 [IE] Ireland .................. 2840/87

[51] Int. Cl.$^5$ ............................ C08F 20/10
[52] U.S. Cl. .................. 525/330.3; 525/293; 525/359.3; 525/359.4
[58] Field of Search ............. 525/293, 359.4, 359.3, 525/330.3

[56] References Cited

U.S. PATENT DOCUMENTS 4,556,700  12/1985  Harris et al. ................ 526/245
4,571,420   2/1986  Marks ...................... 525/350

FOREIGN PATENT DOCUMENTS 57-070170  4/1982  Japan.

OTHER PUBLICATIONS

Chem Abst. 97: 217552u (1982).
Chem Abst. 109: 7756d (1988).
Anal. Chem. 1984, 56, 2523-2528.

Primary Examiner—Paul R. Michl
Assistant Examiner—Thomas McDonald, Jr.
Attorney, Agent, or Firm—Vidas & Arrett

[57] ABSTRACT

Polymers comprising a polymer backbone having pendant or terminal betadiketone groups which contain at least one trifluoromethyl group. The betadiketone groups may be selected from trifluorocetoacetate groups (general formula I);

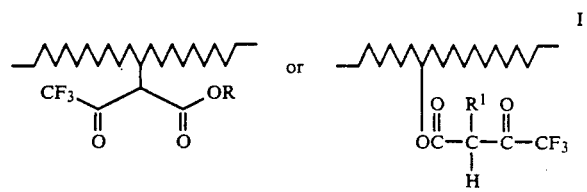

hexafluoroacetylacetone groups (general formula II);

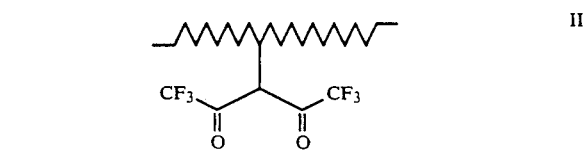

or trifluoro-2,4-pentanedione groups (general formula III);

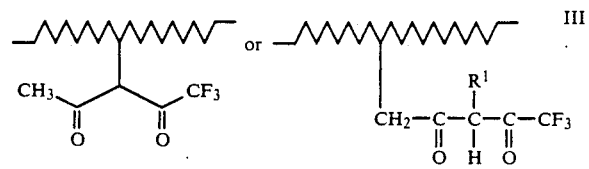

where $\wedge\!\wedge\!\wedge$ indicates the polymer backbone, R is an alkyl, substituted alkyl, aryl or substituted aryl group and $R^1$ is hydrogen, alkyl or substituted alkyl. Neither the R group nor the $R^1$ group should contain any group which is sufficiently basic to initiate cyanoacrylate polymerization or any group sufficiently acidic to interfere with chain transfer.

5 Claims, No Drawings

POLYMERS COMPRISING BETADIKETONE GROUPS AND POLYMERIZABLE COMPOSITIONS CONTAINING SAID POLYMERS

BACKGROUND OF THE INVENTION

1. Field of the Invention

The present invention relates to polymers comprising betadiketone groups, to polymerizable compositions containing the said polymers and to a process for preparing polycyanoacrylate graft copolymers.

2. Description of the Related Art

The instant adhesive property of cyanoacrylate monomers results from the rapid polymerization of the monomer which is triggered by contact with traces of basic material. However, the resulting polymer has poor thermal stability and tends to degrade at temperatures above 70° C. which leads to eventual failure of adhesive bonds. Various means have been suggested to overcome this problem, including synthesis of polyfunctional cyanoacrylate monomers (German Offenlegungsschrift No. 2141226 of Toa Gosei, (1972); U.S. Pat. No. 4,041,061 of Johnson and Johnson (1977), and European Patent No. 26,665 of Japan Synthetic Rubber (1981)), and the addition of putatively copolymerizable monomers (U.S. Pat. No. 3,692,752 of Matsumoto (1972) and French Patent No. 2121825 of Loctite (1972)).

OBJECT OF THE INVENTION

An object of the present invention is to provide a polymer with improved thermal and hydrolytic stability without the loss of instant adhesive properties.

SUMMARY OF THE INVENTION

According to the present invention there are provided polymers comprising a polymer backbone having pendant or terminal betadiketone groups which contain at least one trifluoromethyl group.

For use in polycyanoacrylate graft copolymers, the polymer backbone should be a polymer which is compatible with a cyanoacrylate monomer and should not contain any group which is sufficiently basic to initiate cyanoacrylate polymerization or any group which is sufficiently acidic to interfere with chain transfer.

Preferred polymers are those in which the betadiketone groups are trifluoroacetoacetate groups (general formula I);

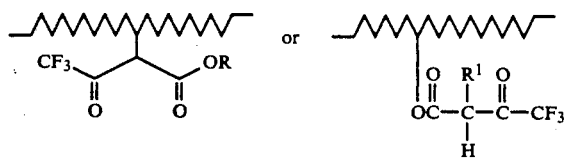

hexafluoroacetylacetone groups (general formula II);

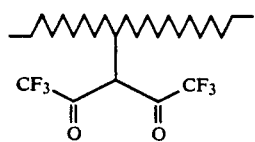

or trifluoro-2,4-pentanedione groups (general formula III);

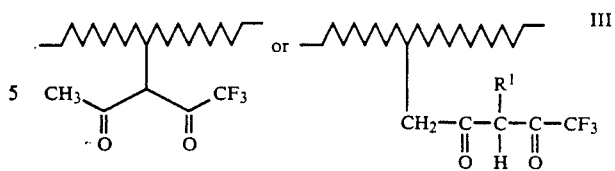

where ⟋⟋⟋ indicates the polymer backbone, R is an alkyl, substituted alkyl, aryl or substituted aryl group and $R^1$ is hydrogen, alkyl or substituted alkyl. Neither the R group nor the $R^1$ group should contain any group which is sufficiently basic to initiate cyanoacrylate polymerization or any group sufficiently acidic to interfere with chain transfer.

Basic groups which could initiate polymerization include amine, pyridine and phosphine groups. Acidic groups which could interfere with chain transfer include sulphonic acid groups. The alkyl groups preferably contain from 1 to 10 carbon atoms, more preferably from 1 to 5 carbon atoms, and the aryl groups preferably have from 6 to 20 carbon atoms, more preferably from 6 to 10 carbon atoms. A substituted derivative of the foregoing may suitably be substituted with one or more halo groups or substituted or interrupted by one or more oxo groups. Halogen may be chlorine, bromine, fluorine or iodine.

The betadiketone groups may be linked to the polymer backbone either through the alpha-methylene carbon atom of any of the groups or through the gamma-ester oxygen atom of the trifluoroacetoacetate group or the gamma carbon atom of the trifluoro-2,4-pentanedione group.

The present invention also provides polymerizable compositions comprising a cyanoacrylate and a supporting polymer as defined above. The standard cyanoacrylate compositions are as described in U.S. Pat. No.4,556,700 Harris et al at column 2, line 18 to column 3, line 32, the contents of which are incorporated herein by reference.

The supporting polymer used in the polymerizable composition must be compatible with cyanoacrylates: that is the polymer and the cyanoacrylate must be miscible in molecular proportions to form an homogenous solution and the two compounds must be stable in solution together.

The polymer backbone may for example be based on poly(vinyl acetate), polyvinyl ethers, polyesters, polyacrylates, polymethacrylates, polystyrene, polyepoxides, polycarbonates, polyacetals, polyalkylenes, polysiloxanes, and copolymers prepared from the monomers used in the preparation of any of the said polymers.

The invention further provides a process for producing a polycyanoacrylate graft copolymer comprising reacting cyanoacrylate monomer with a polymer as defined above, in the presence of a base.

Although the invention is not limited by any theory it is believed that the production of the polycyanoacrylate graft polymer involves initiation of polymerization of the cyanoacrylate monomer by the external base, thus producing a carbanion. Progagation of the polymer then begins at the carbanion. Addition of the polymeric initiator, which acts as a chain transfer agent, leads to transfer of the proton of the carbanion to the polymeric backbone of the initiator so that chain extension in the cyanoacrylate polymer is terminated and polymerization of cyanoacrylate monomer begins at this new carbanion site and continues until transfer of the proton to another site on the polymeric initiator takes place.

The reaction is believed to proceed as follows:

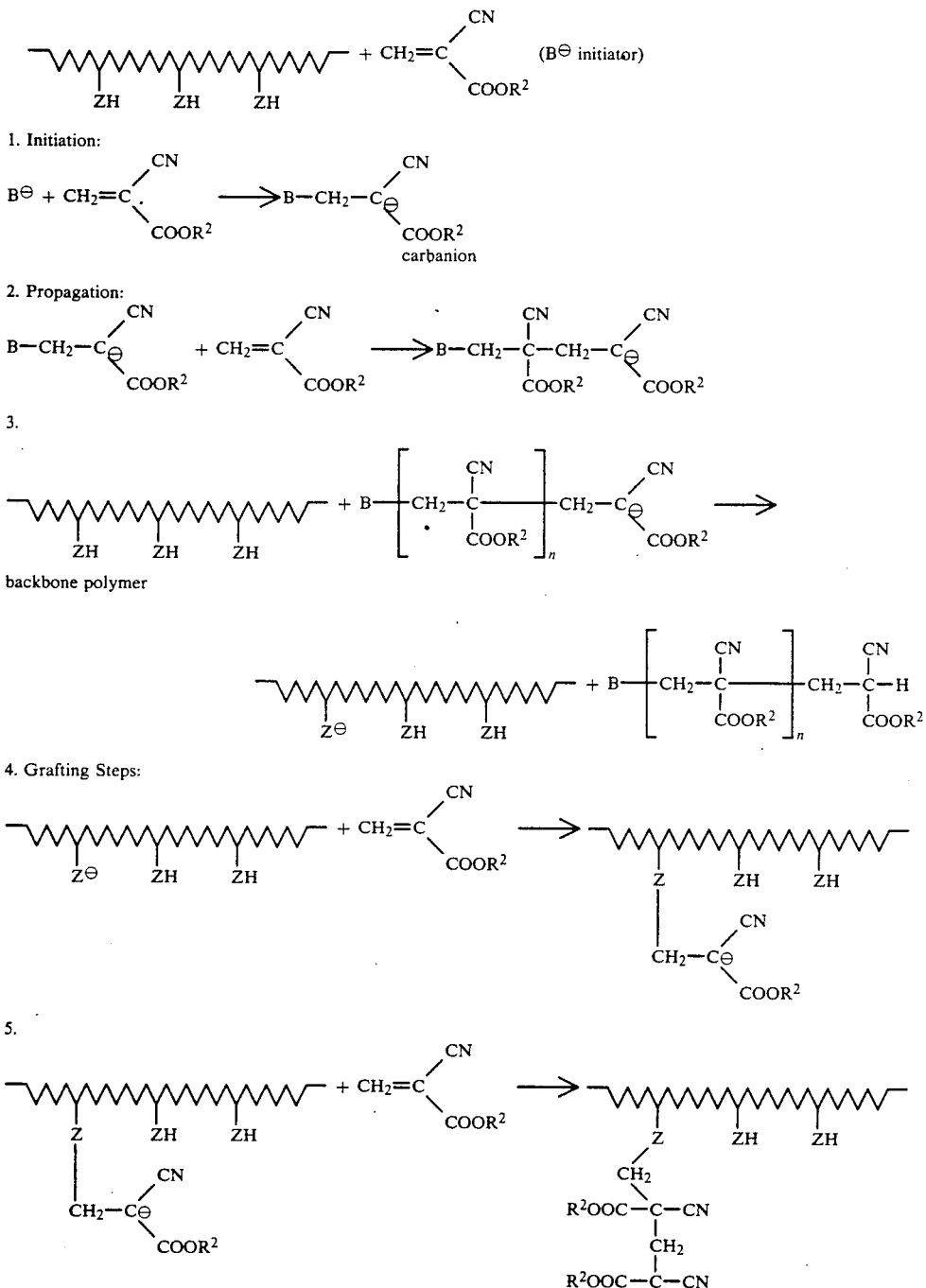

wherein 2 represents the betadiketone group, attached to the polymer backbone, less one hydrogen atom and $R^2$ represents a straight chain or branched chain alkyl group having 1 to 12 carbon atoms (which may be substituted with a substituent such as a halogen atom or an alkoxy group), a straight chain or branched chain alkenyl group having 2 to 12 carbon atoms, a straight chain or branched alkynyl group having 2 to 12 carbon atoms, a cycloalkyl group, an aralkyl group or an aryl group.

Control of end group substitution and production of a structure having a non-cyanoacrylate backbone with pendant polycyanoacrylate groups provides a polymer with improved thermal and hydrolytic stability without losing the instant adhesive property of cyanoacrylate polymerization. The invention allows the incorporation of a wide range of polymer supports allowing modification of the polymer properties of polycyanoacrylates.

DESCRIPTION OF THE PREFERRED EMBODIMENTS

The invention is illustrated in the following Examples.

EXAMPLE 1

0.5 g of poly(vinyl acetate) having an average molecular weight of 20.000 was dissolve in 10 ml of ethyl-1,1,1-trifluoroacetoacetate containing 5 mg of totuene sulfonic acid. This mixture was then heated at 135° C. After 16 hours, the unreacted ethyl-1,1,1-trifluoroacetoacetate was removed by rotary vacuum distillation at 100° C. The resulting solid was dissolved in 20 ml of pure tetrahydrofuran (THF) and 100 μl of this solution was purified by preparative gel permeation chromatography (GPC) (10 μPL Gel columns $10^6$ $10^5$ and $10^4$ Angstrom) using tetrahydrofuran as mobile phase. The high molecular weight fraction was collected to yield 1 mg of an alkali soluble polymer containing vinylacetate and vinyl acetoacetate groups of the structure:

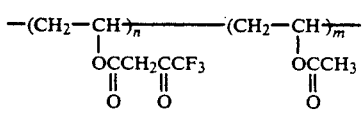

in 2 ml of THF. The GPC analysis (UV detector, 280 nm) indicated that approximately 20 acetoacetate units per molecular chain had been incorporated (i.e. n approximately =20, m approximately =210). (The starting polyvinylacetate is alkali insoluble). Using a refractive index detector, no polymer peak was detected which indicates that there is not a significant difference in refractive index between the product polymer and the mobile phase solvent, THF.

EXAMPLE 2

2 ml of THF and 20 μl of ethyl 2-cyanoacrylate were added to 2 ml of the polymer solution prepared as described in Example 1. The mixture was rapidly stirred and 1.0 μl of a solution prepared by dissolving 0.01 ml of tetrabutylammonium hydroxide in 10 ml of THF, was added. The cyanoacrylate monomer polymerized almost instantly to give a solution of the required grafted polymer whose repeating structure is represented by the formula:

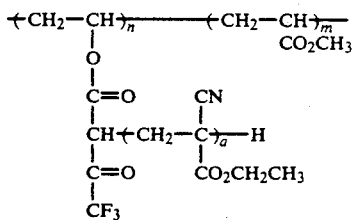

along with a small quantity of the homopolymer derived from the cyanoacrylate monomer. The grafted structure was confirmed from the gel permeation chromatogram which showed the product to be higher in molecular weight than the starting ungrafted polymer. The chromatograms produced by both the UV detector, at 280 nm and the refractive index detector were similar, which is a further indication that the required grafted polymer had formed. The homopolymer prepared by polymerizing ethyl 2-cyanoacrylate in THF solvent using tetrabutylammonium hydroxide as catalyst was not detected in the gel permeation chromatogram using a UV detector at 280 nm, which is confirmatory evidence that homopolymerization is not a major reaction in the presence of the trifluoroacetoacetate functionalized polymer.

We claim:

1. Polymerizable compositions comprising a cyanoacrylate and a polymer comprising a polymer backbone having pendant or terminal betadiketone groups which contain at least one trifluoromethyl group, said polymer being compatible with the cyanoacrylate monomer and being free of any group which is sufficiently basic to initiate cyanoacrylate polymerization or any group which is sufficiently acidic to interfere with chain transfer.

2. Compositions as claimed in claim 1 wherein the polymer backbone is selected from polymers based on poly(vinyl acetate), polyvinyl-ethers, polyesters, polyacrylates, polymethacrylates, polystyrene, polyepoxides, polycarbonates, polyacetals, polyalkylenes, polysiloxanes, and copolymers prepared from the monomers used in the preparation of any of the said polymers.

3. A process for producing a cyanoacrylate graft copolymer comprising reacting cyanoacrylate monomer with a polymer comprising a polymer backbone having pendant or terminal betadiketone groups which contain at least one trifluoromethyl group, said polymer being compatible with the cyanoacrylate monomer and being free of any group which is sufficiently basic to initiate cyanoacrylate polymerization or any group which is sufficiently acidic to interfere with chain transfer in the presence of a base.

4. Compositions as claimed in claim 1 wherein the betadiketone groups are selected from trifluorocetoacetate (general formula I);

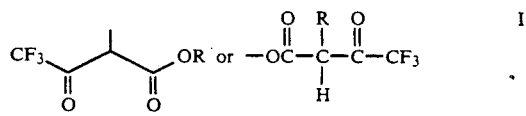

hexafluoroacetylacetone groups (general formula II);

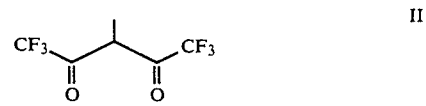

or trifluoro-2,4-pentanedione groups (general formula III);

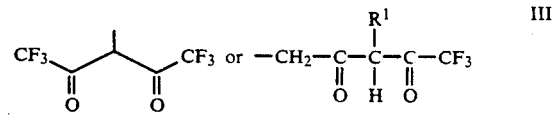

where R is alkyl, substituted alkyl, aryl or substituted aryl group, and $R^1$ is hydrogen, alkyl or substituted alkyl, with the proviso that neither the R group nor the $R^1$ group contains any group which is sufficiently basic to initiate cyanoacrylate polymerization, or any group sufficiently acidic to interfere with chain transfer.

5. A process as claimed in claim 3 wherein the betadiketone groups are selected from trifluoroacetate (general formula I);

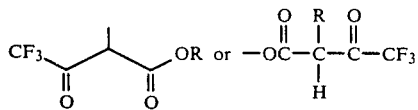

hexafluoroacetylacetone groups (general formula II);

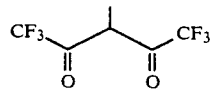

or trifluoro-2,4-pentanedione groups (general formula III);

where R is alkyl, substituted alkyl, aryl or substituted aryl group, and $R^1$ is hydrogen, alkyl or substituted alkyl, with the proviso that neither the R group nor the $R^1$ group contains any group which is sufficiently basic to initiate cyanoacrylate polymerization, or any group sufficiently acidic to interfere with chain transfer.

* * * * *

UNITED STATES PATENT AND TRADEMARK OFFICE
CERTIFICATE OF CORRECTION

PATENT NO. : 5,039,753
DATED : August 13, 1991
INVENTOR(S) : John G. Woods et al It is certified that error appears in the above—identified patent and that said Letters Patent is hereby corrected as shown below:

Col. 5, line 54 insert - (n and M have the values indicated in Example 1 and "a" indicates the number of grafted cyanoacrylate units on each grafting site).

Signed and Sealed this

Twenty-seventh Day of October, 1992

*Attest:*

DOUGLAS B. COMER

*Attesting Officer*     *Acting Commissioner of Patents and Trademarks*